(12) United States Patent
Colombet

(10) Patent No.: US 7,304,776 B2
(45) Date of Patent: Dec. 4, 2007

(54) INTEGRATED OPTICAL STRUCTURES WITH ELECTRICALLY CONDUCTIVE PARTS

(75) Inventor: Norbert Colombet, Domène (FR)

(73) Assignee: Opsitech-Optical System on a Chip, Grenoble Cedex (FR)

( * ) Notice: Subject to any disclaimer, the term of this patent is extended or adjusted under 35 U.S.C. 154(b) by 422 days.

(21) Appl. No.: 10/478,005

(22) PCT Filed: May 14, 2002

(86) PCT No.: PCT/FR02/01604

§ 371 (c)(1), (2), (4) Date: Jun. 7, 2004

(87) PCT Pub. No.: WO02/093199

PCT Pub. Date: Nov. 21, 2002

(65) Prior Publication Data
US 2004/0232521 A1  Nov. 25, 2004

(30) Foreign Application Priority Data
May 15, 2001 (FR) ................... 01 06356

(51) Int. Cl.
G03H 1/16 (2006.01)
G02B 6/26 (2006.01)

(52) U.S. Cl. .......................................... 359/29; 385/14
(58) Field of Classification Search ..................... None
See application file for complete search history.

(56) References Cited

U.S. PATENT DOCUMENTS

| 5,612,815 A * | 3/1997 | Labeye et al. ............... 359/320 |
| 6,236,774 B1 * | 5/2001 | Lackritz et al. ................ 385/14 |
| 6,343,164 B1 * | 1/2002 | Robertsson et al. ........... 385/14 |

FOREIGN PATENT DOCUMENTS

| EP | 0 709 711 | 5/1996 |
| WO | WO 99/45416 | 9/1999 |
| WO | WO 00/57221 | 9/2000 |

* cited by examiner

Primary Examiner—Sung Pak
Assistant Examiner—Hoang Tran
(74) Attorney, Agent, or Firm—Young & Thompson

(57) ABSTRACT

The invention concerns a integrated optical structure comprising a plurality of parts made at least of a dielectric material, stacked according to the levels of integration and defining at least an optical microguide, and further comprising at least an integrated part (15) made of an electrically conductive material, interposed or inserted between at least two of said dielectric parts and having at least one part (11a) externally accessible to said dielectric parts for at least an external electrical connection.

12 Claims, 6 Drawing Sheets

INTEGRATED OPTICAL STRUCTURES WITH ELECTRICALLY CONDUCTIVE PARTS

The present invention relates to the field of integrated optical structures.

In general, an integrated optical structure comprises a multiplicity of parts made of dielectrics, these being stacked in levels of integration and defining integrated optical microguides for the transmission, conversion or treatment of light waves.

Certain integrated optical structures furthermore have metallic surface regions that are connected via metal wires, constituting wire bridges, to an electrical control or supply source. This is in particular the case in integrated optical structures that include actuators composed of combs lying in a cavity and having tines lying along and at a certain distance from fixed surfaces, said metallic regions extending along the lateral faces of the tines and along the fixed surfaces so as to constitute comb displacement electrodes.

Such arrangements have the following main drawbacks. The operations of mounting the electrical connection wires are time-consuming and tedious, and must be carried out accurately. These electrical connection wires project from the surface of the optical structures and there is a risk of them touching one another.

The object of the present invention is to improve integrated optical structures so as to facilitate and improve the electrical connections of functional parts of such structures that require a power supply.

The integrated optical structure according to the invention comprises a multiplicity of parts made of at least one dielectric, that are stacked in levels of integration and define at least one optical microguide.

According to the invention, this structure furthermore includes at least one conducting integrated part made of an electrically conducting material, that is interposed or inserted between at least two of said dielectric parts, and at least one connection part made of an electrically conducting material, externally accessible to said dielectric parts for the purpose of making at least one external electrical connection to this conducting integrated part.

The integrated structure according to the invention comprises at least two groups of electrically conducting regions produced in one level of integration.

According to the invention, at least one conducting integrated part includes at least one main part lying in a different level of integration from that of said groups and crossing at least one conducting region of one of said groups and secondary parts lying perpendicular to the planes of integration and connecting this main part and the conducting regions of the other group.

According to the invention, at least two conducting integrated parts may advantageously comprise at least one main part lying in at least one level of integration and secondary parts, respectively, which connect their main parts and the metal regions of said groups, respectively.

According to the invention, at least one of said upper conducting regions preferably includes at least one part constituting an electrode.

The integrated structure according to the invention may advantageously include a moveable member provided with at least one electrode located opposite, and at a certain distance from and electrically coupled to, said part, constituting an electrode so as to form an optical actuator.

According to the invention, said moveable member may advantageously carry at least one optical microguide.

According to the invention, at least one conducting integrated part preferably includes at least one main part lying in one level of integration and, at least at one point in this main part, a secondary part lying perpendicular to the planes of integration and passing through at least one dielectric part adjacent to this point.

According to the invention, at least one secondary part preferably constitutes an external electrical connection part.

According to the invention, at least two conducting integrated parts preferably include main parts lying in different levels of integration.

According to the invention, said conducting integrated parts preferably include main parts that intersect at a point and at least one secondary part lying perpendicular to the planes of integration and passing through the dielectric part or parts separating said main parts at this point so as to connect these main parts.

According to the invention, at least one conducting integrated part preferably includes at least one integrated main part constituting an electrical resistor lying along and in the vicinity of one part of an integrated microguide and secondary parts that are externally accessible, for the purpose of making an external electrical connection to this main part.

According to the invention, said electrical resistor is preferably a resistance heating element.

According to the invention, said electrical resistor may advantageously be a temperature measurement resistor.

According to another embodiment of the invention, at least one conducting integrated part may advantageously include at least one integrated main part constituting an electrical resistor lying along and in the vicinity of one part of an integrated microguide and secondary parts that are externally accessible, for the purpose of making an external electrical connection to this main part.

According to the invention, said electrical resistor may be a resistance heating element.

According to the invention, said electrical resistor may be a temperature measurement resistor.

The present invention will be more clearly understood on examining integrated optical structures that are described by way of non-limiting examples and illustrated by the drawing in which.

Figure 1:
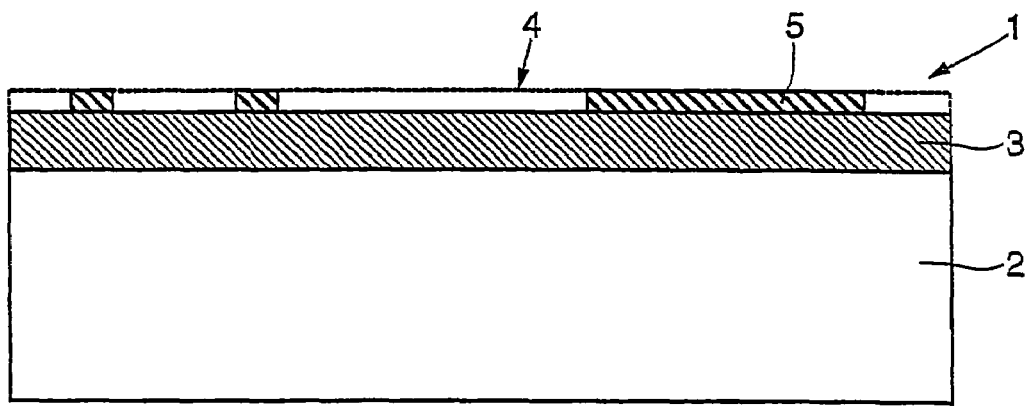
FIGS. 1 to 6 show, in section, an integrated optical structure according to the present invention, in its successive fabrication steps.

FIG. 1 shows an integrated optical structure 1 in the course of fabrication, which comprises a support wafer 2, for example made of silicon, on one face of which a layer 3 made of a dielectric or electrically nonconducting material, for example undoped silica, is deposited.

Next, a layer 4 made of an electrically conducting material, for example polycrystalline silicon, titanium, titanium nitride or tungsten, is deposited. Depending on predetermined requirements, one or more conducting tracks or regions 5 are then produced, using a photolithography and etching process, by removing the material of the layer external to these regions 5.

Figure 2:
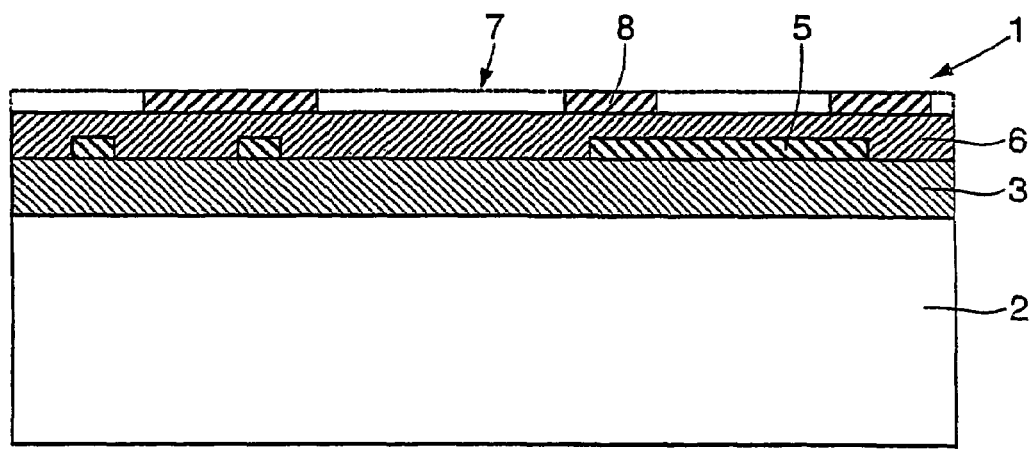

FIG. 2 shows how the process continues with the deposition of a layer 6 of a dielectric or electrically nonconducting material, for example doped silica, silicon nitride or silicon oxynitride. The layer 6 is such that the conducting tracks or regions 5 produced above are covered.

After optional planarization of the surface of the layer 6, a layer 7 made of an electrically conducting material, for example polycrystalline silicon, titanium, titanium nitride or tungsten, is deposited.

One or more conducting tracks or regions 8 are then produced using a photolithography and etching process, by removal of the material of the layer 7 external to these regions 8.

Figure 3:
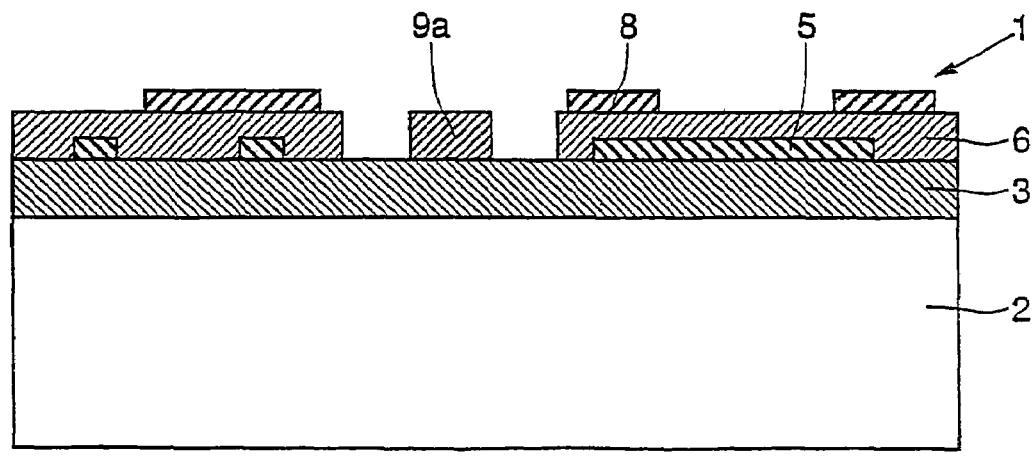

Referring to FIG. 3, an optical wave transmission core 9a of square or rectangular cross section is then produced in the dielectric layer 6 using a photolithography and etching process, by removal of the material of this layer 6 on either side of this core, this operation being carried out in such a way that the transmission core 9a has a predetermined design or path.

Of course, during the design of the optical structure 1, the nonconducting tracks or regions 5 and 8 are preferably arranged so as to be located laterally to and at a certain distance from the transmission core 9a to be obtained.

Figure 4:
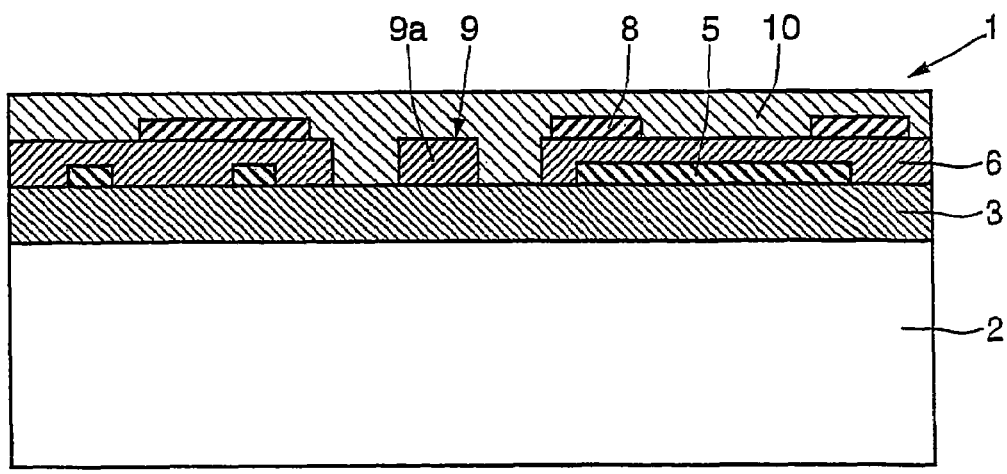

Next, as shown in FIG. 4, a layer 10 of a dielectric or electrically nonconducting material, for example undoped silica, is deposited. This layer 10 fills the spaces left on either side of the transmission core 9a produced in the layer 6 and covers the conducting regions or tracks 8.

As a result, the transmission core 9a and the layers 3 and 10 that surround it define an integrated optical microguide 9.

Figure 5:
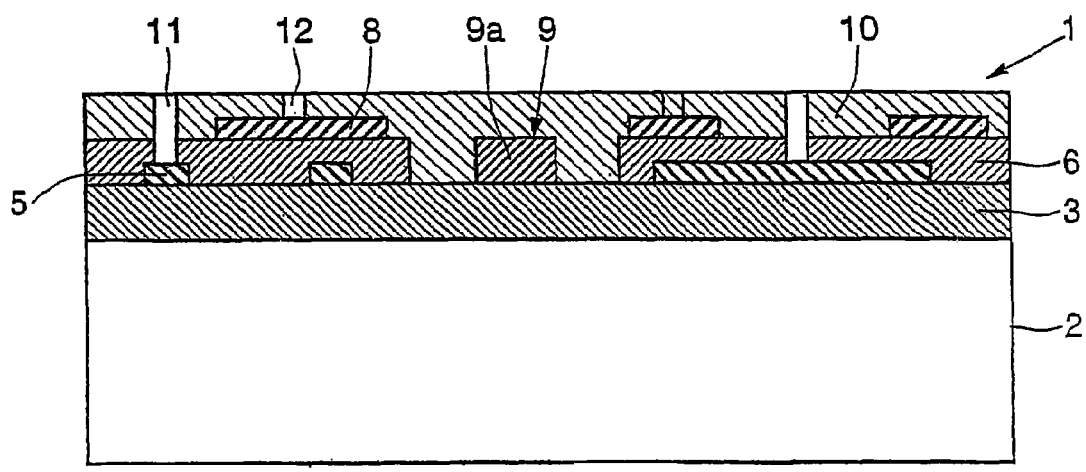

Next, as shown in FIG. 5, holes or wells 11, passing through the dielectric layers 6 and 10 and emerging at points located above the conducting tracks or regions 5, and holes or wells 12, passing through the layer 10 and emerging at points located above the conducting regions or tracks 8, are produced, for example using a photolithography and etching process.

Figure 6:
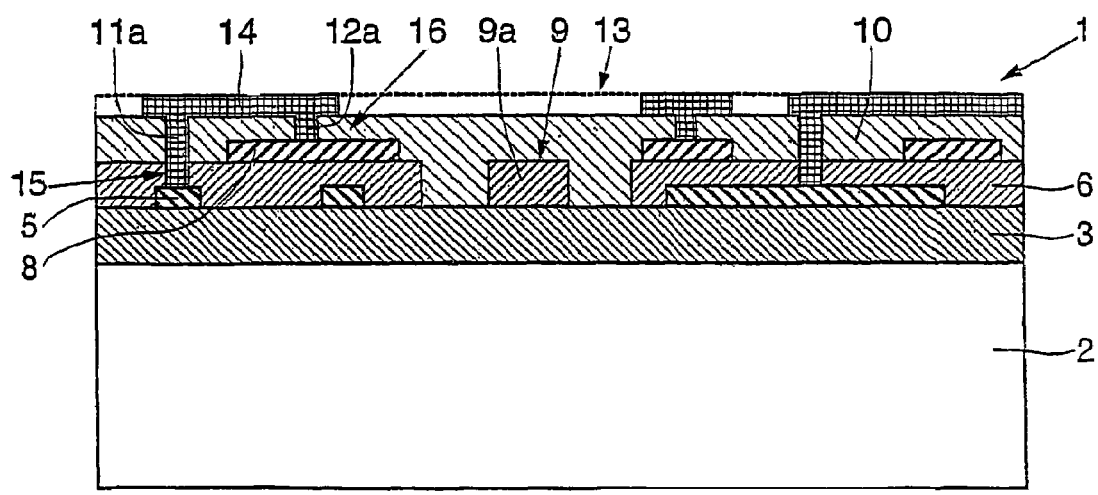
Figure 7:
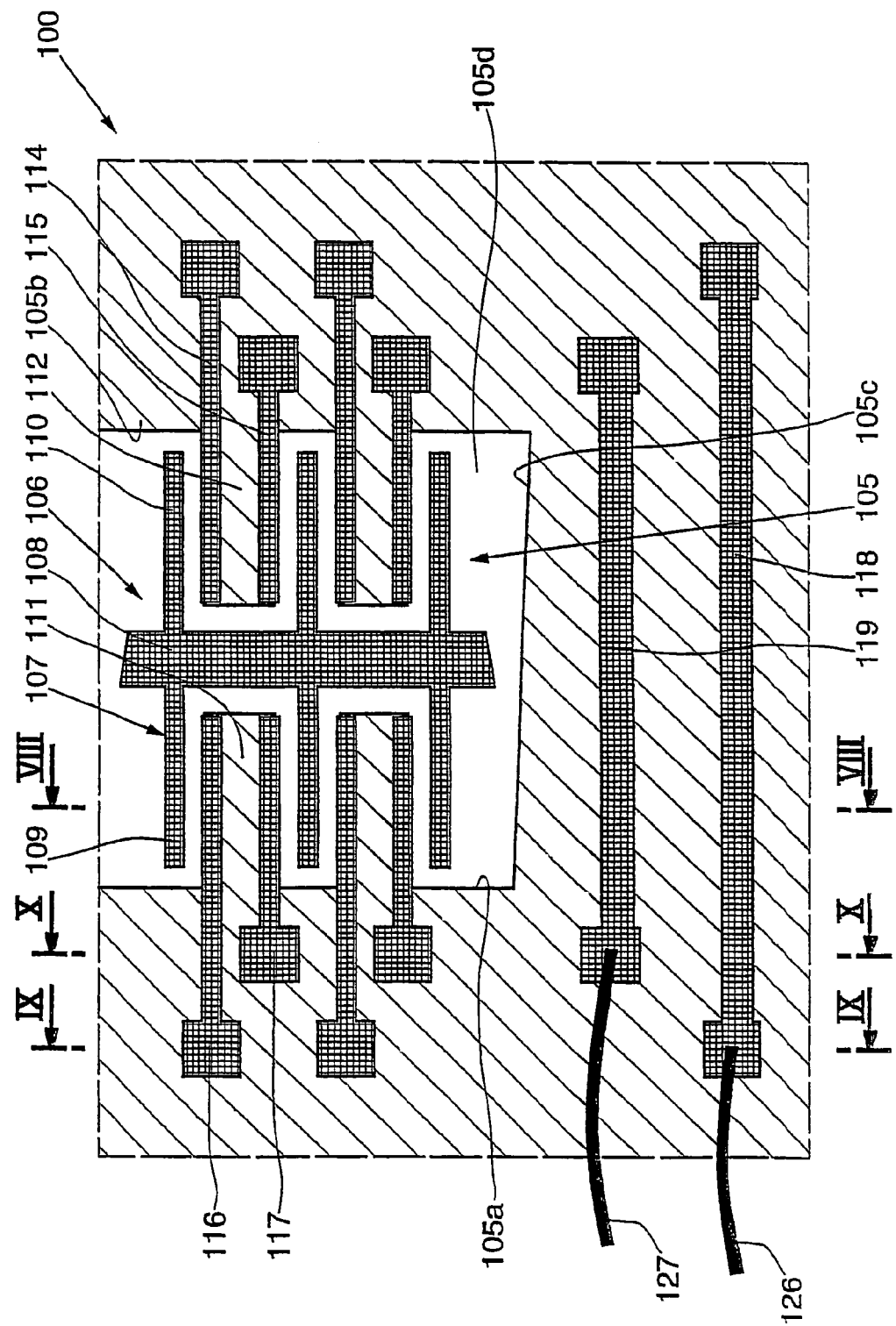
FIG. 7 shows a top view of another integrated optical structure according to the present invention.
Figure 8:
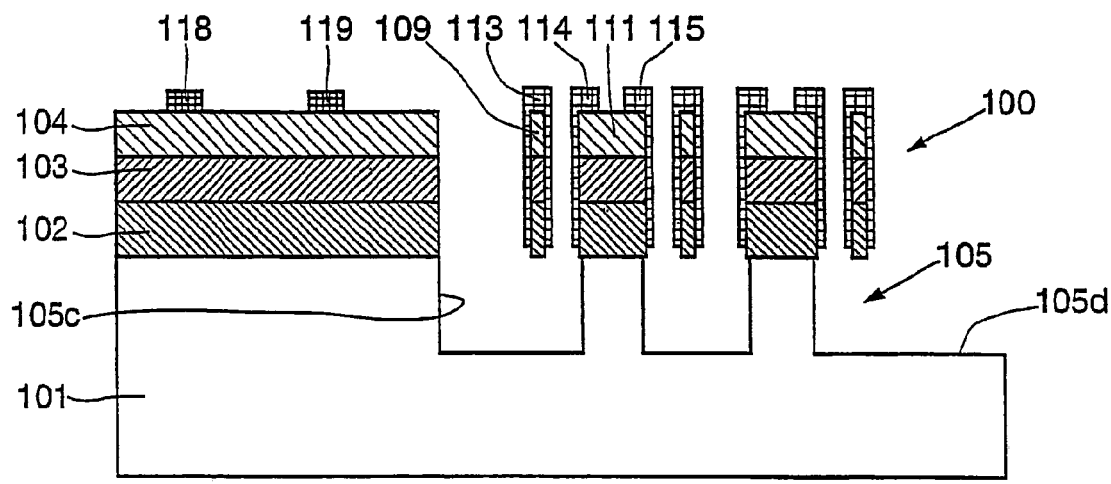
FIG. 8 shows a cross section on VIII-VIII of the integrated optical structure of FIG. 7.

Finally, as shown in FIG. 6, a layer 13 made of an electrically conducting material, for example polycrystalline silicon, titanium, titanium nitride, tungsten or aluminum, is deposited, this material filling the holes or wells 11 and 12 so as to constitute interconnect vias 11a and 12a.

Next, using a photolithography and etching process, upper conducting regions 14 are produced by removal of the material of the layer 13 external to these regions, these conducting regions 14 lying respectively above at least one of the holes or wells 11 and 12 produced beforehand and filled by the interconnect vias 11a and 12a.

As a result of the foregoing operations, the integrated optical structure 1, as shown in definitive form in FIG. 6, comprises electrically conducting integrated parts 15 that have main parts consisting of the conducting tracks or regions 5 produced in the plane of integration subjacent to the transmission core 9a and secondary parts consisting of the interconnect vias 11a formed perpendicularly to this plane of integration, respectively, and electrically conducting integrated parts 16 that have main parts consisting of the conducting tracks or regions 8 produced in the plane of integration subjacent to the upper layer 10 and secondary parts consisting of the interconnect vias 12a formed perpendicular to this plane of integration, respectively.

The interconnect vias 11a and 12a are accessible externally to the structure 1, the upper conducting regions being produced so as to make it easier for external electrical connections to the integrated conducting parts 15 and 16 and/or so as to produce, according to predetermined requirements, selective electrical interconnects between these integrated conducting parts.

In the example shown in FIG. 6, the integrated optical structure 1 is such that the conducting integrated parts 15 and 16 are placed a sufficient distance from the transmission core 9a of the optical microguide 9 so as not to disturb the propagation of the optical wave in this transmission core 9a.

In an alternative embodiment, the conducting regions or tracks 5 and 7 could be formed in trenches provided in the dielectric layers 3 and 6 after chemical-mechanical polishing of the conducting layers 4 and 7 that fill these trenches.

Referring to FIGS. 7 to 10, an integrated optical structure 100 will now be described that implements in one particular way the arrangements described with reference to FIGS. 1 to 6.

The optical structure 100 comprises, as in the previous example, a support wafer 101 corresponding to the support wafer 2 and, in succession, three layers 102, 103 and 104 corresponding to the layers 3, 6 and 10.

The structure 100 has a cavity 105 hollowed out through the layers 102, 103 and 104 and into the support wafer 101, said cavity having two parallel walls 105a and 105b, an end wall 105c and a bottom 105d.

The cavity 105 is produced so as to form an actuator 106 that comprises a moveable member 107 free underneath and having a main branch 108, that extends parallel to the walls 105a and 105b, and, on each side of this main branch 108, spaced-apart transverse secondary branches 109 and 110, and also fixed parts 111 and 112 that project from the walls 105a and 105b, and the sidewalls or lateral faces of which lie parallel to and a certain distance from the sidewalls or lateral faces of the secondary branches 109 of the moveable member 107.

The upper face of the moveable member 107 and the sidewalls or lateral faces of its secondary branches 109 and 110 are covered with a coating of an electrically conducting material 113 so as to constitute electrodes.

The opposed sidewalls or lateral faces of the fixed parts 111 and 112 and the upper face of these projecting parts 111 and 112 are provided with coatings 114 and 115 made of an electrically conducting material respectively, these being electrically isolated from each other so as to constitute independent electrodes. These coatings 114 and 115 extend beyond the projecting parts 111 and 112 on the upper face of the layer 104 so as to constitute independent electrically conducting upper regions 116 and 117.

The upper face of the layer 104 furthermore carries coatings 118 and 119 made of a conducting material which run along at a certain distance from the end wall 105c of the cavity 105.

The optical structure 10 includes, on either side of and at a certain distance from the cavity 105, the integrated conducting parts 120 and 121 that correspond to the integrated conducting parts 15 and 16 of the example described with reference to FIG. 6.

Figure 9:
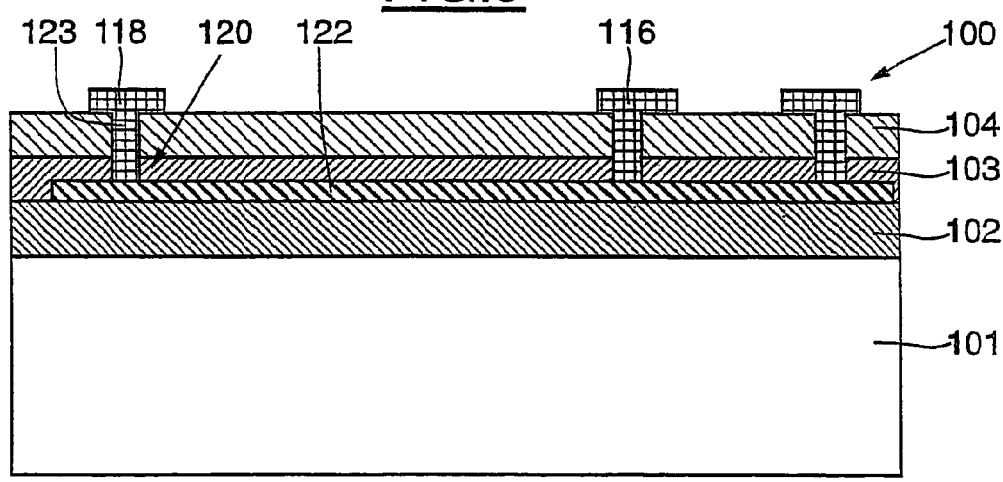
FIG. 9 shows a cross section on IX-IX of the integrated optical structure of FIG. 7.

As shown in FIG. 9, the integrated conducting parts 120 comprise integrated main parts or tracks 122 and interconnect vias 123 that are formed below the upper conducting regions 116 and the upper conducting region 118, respectively. Thus, all the corresponding electrodes 114 are electrically connected together.

Figure 10:
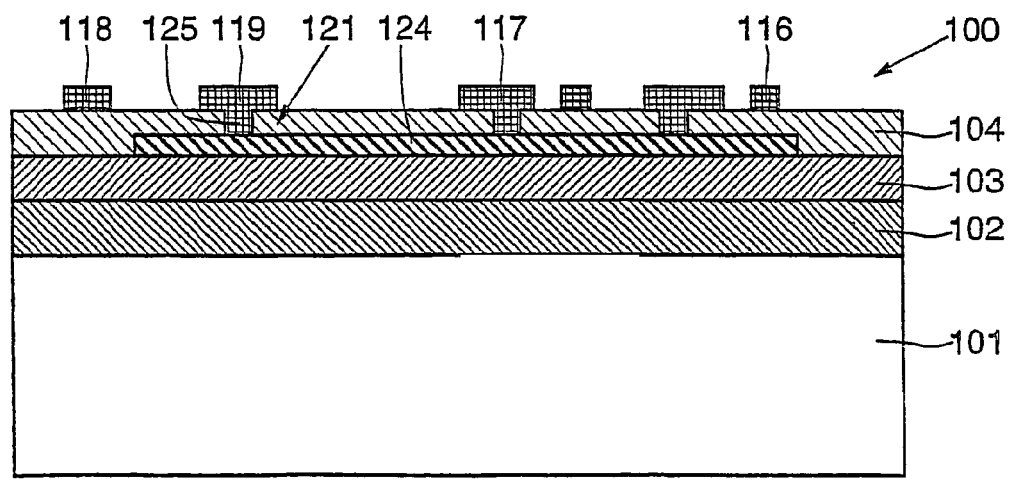
FIG. 10 shows a cross section on X-X of the integrated optical structure of FIG. 7.

Likewise, as shown in FIG. 10, the integrated conducting parts 121 comprise integrated main parts or tracks 124 and interconnect vias 125 that are formed below the upper conducting regions 116 and the upper conducting region 118, respectively. Thus, all the corresponding electrodes 115 are electrically connected together.

It is then possible to connect all the electrodes 114 and all the electrodes 115 to a power supply solely by two electrically conducting wires 126 and 127 that are soldered to one of the upper conducting regions 116 and 117 or to the upper conducting regions 118 and 119, respectively.

By supplying power to the electrodes 113 of the moveable member 107 via electrical connection means (not shown) such as an electrical wire and by supplying power selectively to the electrodes 113, by means of the electrical wires 127 and 128, the moveable member 107 of the actuator 106 can be displaced parallel to its main branch 108 in one direction or the other.

In one example, the moveable member 107 of the actuator 106 may be connected to a beam or to an optical switching platform carrying one or more optical microguides as described in patents FR-A-90/03902 and FR-A-95/00201.

Figure 11:
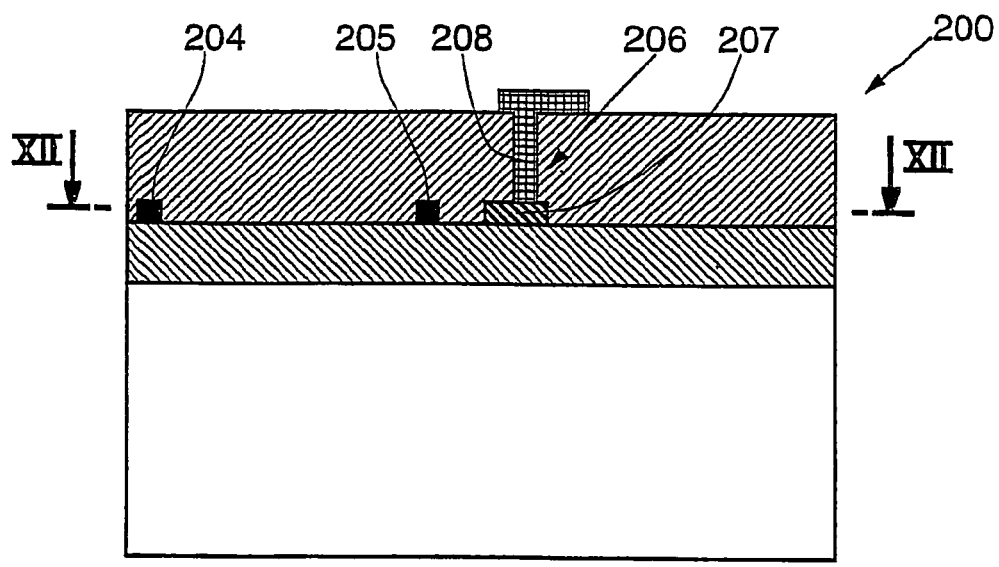
FIG. 11 shows a cross section of another integrated optical structure according to the present invention.
Figure 12:
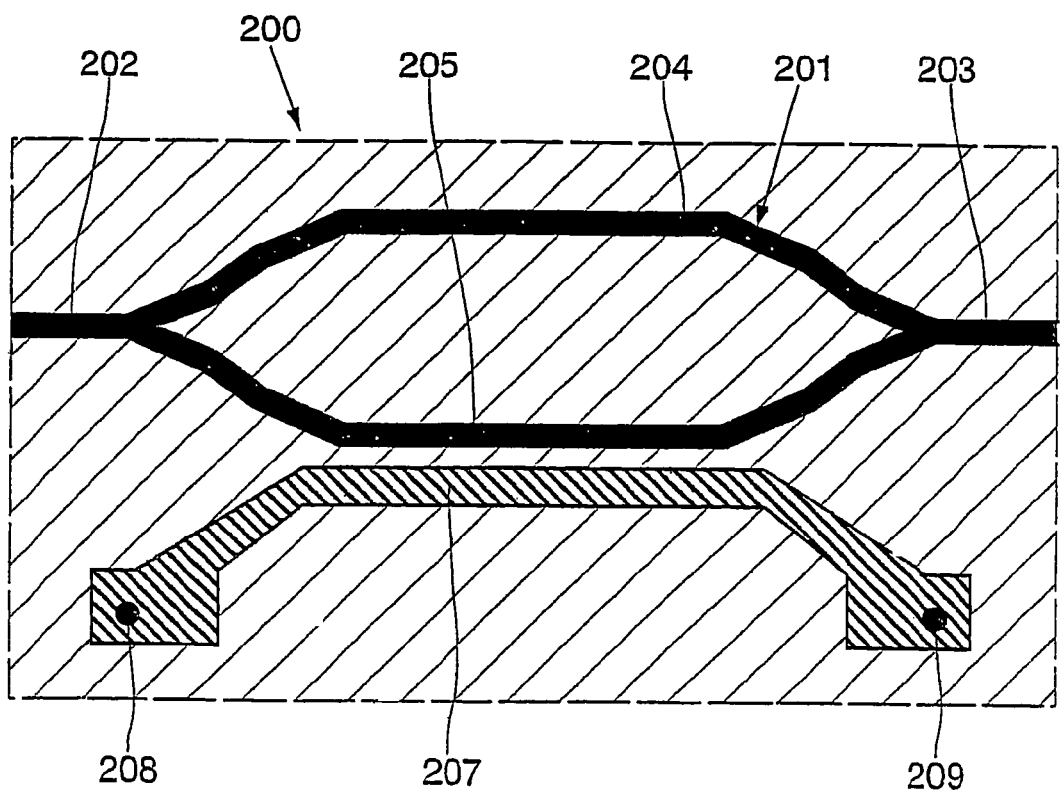
FIG. 12 shows a horizontal section on XII-XII of the integrated optical structure of FIG. 11.

FIGS. 11 and 12 show an integrated optical structure 200 that comprises a Mach-Zehnder interferometer 201 formed by an input microguide 202, an output microguide 203 and two microguides 204 and 205 that connect the microguides 202 and 203 in parallel.

The optical structure 200 furthermore includes an electrically conducting integrated part 206 produced like the integrated conducting part 15 described with reference to FIG. 6.

This integrated conducting part 206 comprises a main part 207, that is produced in the plane of integration of the aforementioned optical microguides and lies along and a short distance from the optical microguide 205, and two interconnect vias 208 and 209 for electrically connecting the ends of the conducting main part 207 to an external power supply.

The main part 207 of the integrated conducting part 206 may then form a resistance heating element capable of varying, by thermal conduction, the temperature of the optical microguide 205 in such a way that the Mach-Zehnder interferometer 201 can form an optical switch, an optical attenuator or an optical interrupter.

According to another embodiment, the main part 207 of the integrated conducting part 206 could be used for the purpose of measuring the temperature of the structure in its environment.

Figure 13:
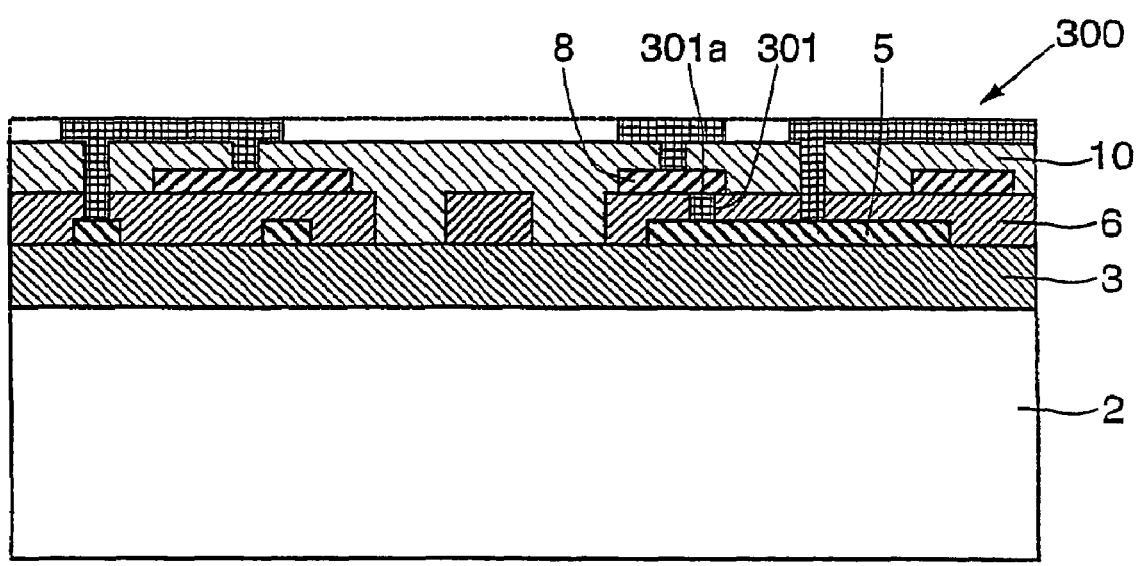
FIG. 13 shows, in section, an alternative embodiment of the integrated optical structure of FIGS. 1 to 6.

FIG. 13 shows an integrated optical structure 300 that differs from the integrated optical structure 1 described with reference to FIGS. 1 to 6 by the fact that, before the conducting layer 7 is deposited on the dielectric layer 6 at least one hole 301 is made in this dielectric layer 6 above at least one conducting track or region 5.

As the conducting layer 7 is being deposited, the material of which it is composed fills the hole 301 and constitutes an interconnect via 301a.

During the step of etching the conducting layer 7, a track or region 8 is produced above the hole 301 and is electrically connected to the track or region 5 beneath the interconnect via 301a.

Thus, electrical connections between levels may be produced.

The present invention is not limited to the examples described above. Many alternative embodiments are possible without departing from the scope defined by the appended claims.

The invention claimed is:

1. An integrated optical structure (100), comprising:
   a support wafer (101);
   in succession, three dielectric layers (102, 103, 104) located on said support wafer;
   a cavity (105) hollowed out through the three dielectric layers and into the support wafer, said cavity having two parallel walls (105a, 105b), an end wall (105c) and a bottom (105d);
   an actuator (106) located within said cavity and comprising
   a moveable member (107) having i) a main branch (108) that extends parallel to said parallel walls (105a, 105b), ii) spaced-apart transverse secondary branches (109, 110) connected to said main branch, each second branch having a free lower surface spaced apart from said bottom of said cavity with a free space between the lower surface and said bottom of said cavity, and iii) fixed parts (111, 112) projecting from said two parallel walls (105a, 105b) and respectively extending between said transverse secondary branches so that sidewalls of said fixed parts lie parallel to sidewalls of said secondary branches,
   first electrodes (113) located on an upper surface of said transverse secondary branches,
   second electrodes (114, 115) located on an upper surface of said fixed parts;
   exactly and only two external upper conducting regions (118, 119) configured so that by supplying power to only said two upper conducting regions displaces the moveable member (107) of the actuator (106) with respect to the main branch (108); and
   connections connecting said second electrodes to said two external upper conducting regions, said connections including tracks (122, 124) located between said dielectric layers and plural vias (123, 125) that run up from the tracks to the upper conducting regions and the second electrodes.

2. The integrated optical structure (100) of claim 1, wherein,
   said first electrodes further cover the sidewalls of said transverse secondary branches, and
   said lower surface free of said transverse secondary branches is free of said first electrodes.

3. The integrated optical structure (100) of claim 2, wherein,
   said second electrodes further cover the sidewalls of said fixed parts,
   the second electrode of each fixed part being electrically isolated from the other second electrodes so that each second electrode constitutes an independent electrode.

4. The integrated optical structure (100) of claim 3, wherein,
   the secondary electrodes extend beyond the fixed parts and onto an upper face of an uppermost one (104) of the three dielectric layers, and
   further comprising independent electrically conducting upper regions (116, 117), located on the upper face of the uppermost dielectric layer, terminating each of the secondary electrodes.

5. The integrated optical structure (100) of claim 1, wherein,
   said two external upper conducting regions comprise conductive coatings (118, 119) running on an upper face of an uppermost one (104) of the three dielectric layers at a distance spaced from the end wall (105c) of the cavity (105).

6. The integrated optical structure (100) of claim 1, wherein,
said connections connecting said second electrodes to said two external upper conducting regions are integrated conducting parts (120, 121) comprising the tracks (122, 124) running between two of said three dielectric layers and interconnecting the vias (123) running up through at least one of said three dielectric layers.

7. The integrated optical structure (100) of claim 6, wherein said integrated conducting parts are all formed below an uppermost surface of an uppermost one of said three dielectric layers.

8. An integrated optical structure (100), comprising:
a support wafer (101);
plural dielectric layers (102, 103, 104) located one on another on said support wafer;
a cavity (105) hollowed out through the dielectric layers and into the support wafer, said cavity having two parallel walls (105a, 105b), an end wall (105c) and a bottom (105d);
an actuator (106) located within said cavity and comprising
a moveable member (107) having i) a main branch (108), ii) spaced-apart transverse secondary branches (109, 110) connected to said main branch, each second branch having a free lower surface spaced apart from said bottom of said cavity, and iii) fixed parts (111, 112) projecting from said two parallel walls (105a, 105b) and respectively extending between said transverse secondary branches,
first electrodes (113) located on an upper surface of said transverse secondary branches,
second electrodes (114, 115) located on an upper surface of said fixed parts;
two external upper conducting regions configured for connecting exactly two conducting wires to power said actuator so that the moveable member (107) of the actuator (106) is displaced with respect to the main branch (108); and
connections located exclusively within the dielectric layers and connecting said second electrodes to said two external upper conducting regions, said connections including tracks (122, 124) located between said dielectric layers and plural vias (123, 125) that run up from the tracks to the upper conducting regions and the second electrodes.

9. The integrated optical structure (100) of claim 8, wherein,
said first electrodes further cover the sidewalls of said transverse secondary branches while leaving said lower surface free of said transverse secondary branches free of said first electrodes,
said second electrodes further cover the sidewalls of said fixed parts, the second electrode of each fixed part being electrically isolated from the other second electrodes so that each second electrode constitutes an independent electrode,
the secondary electrodes extend beyond the fixed parts and onto an upper face of an uppermost one (104) of the dielectric layers.

10. The integrated optical structure (100) of claim 8, wherein,
said two external upper conducting regions comprise conductive coatings (118, 119) running on an upper face of an uppermost one (104) of the dielectric layers at a distance spaced from the end wall (105c) of the cavity (105) and with a length greater than a corresponding length of the cavity.

11. The integrated optical structure (100) of claim 8, wherein,
said connections connecting said second electrodes to said two external upper conducting regions are integrated conducting parts (120, 121) comprising the tracks (122) running between two of said dielectric layers and interconnecting the vias (123) running up through at least one of said dielectric layers.

12. An integrated optical structure (100), comprising:
a cavity (105) located within a succession of dielectric layers, said cavity having two parallel walls (105a, 105b), an end wall (105c) and a bottom (105d);
an actuator 106 located within said cavity and comprising
a moveable member (107) having i) a main branch (108) that extends within said parallel walls (105a, 105b), ii) spaced-apart, transverse movable secondary branches (109, 110) connected to said main branch, and iii) fixed parts (111, 112) projecting from said two parallel walls (105a, 105b) and respectively extending between said transverse secondary branches,
first electrodes (113) located on said transverse secondary branches,
second electrodes (114, 115) located on said fixed parts;
two external upper conducting regions configured so that by supplying power to only said two external upper conducting regions displaces the moveable member (107) of the actuator (106) with respect to the main branch (108); and
connections connecting said second electrodes to said two external upper conducting regions, said connections including tracks (122, 124) located between said dielectric layers and plural vias (123, 125) that run up from the tracks to the upper conducting regions and the second electrodes.

* * * * *